(12) United States Patent
Dettinger et al.

(10) Patent No.: US 7,991,788 B2
(45) Date of Patent: Aug. 2, 2011

(54) ABSTRACT DATA MODEL FILTERS

(75) Inventors: Richard D. Dettinger, Rochester, MN (US); Jennifer L. LaRocca, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 2133 days.

(21) Appl. No.: 10/401,293

(22) Filed: Mar. 27, 2003

(65) Prior Publication Data

US 2004/0193568 A1 Sep. 30, 2004

(51) Int. Cl.
*G06F 17/30* (2006.01)

(52) U.S. Cl. .................................. 707/783; 707/999.009

(58) Field of Classification Search ................. 707/1–10, 707/101, 104.1, 754, 783, 787, 789, 999.003, 707/999.006, 999.009; 709/203–205
See application file for complete search history.

(56) References Cited

U.S. PATENT DOCUMENTS

| | | | |
|---|---|---|---|
| 5,253,362 A | 10/1993 | Nolan et al. | |
| 5,734,887 A | 3/1998 | Kingberg et al. | |
| 5,761,463 A | 6/1998 | Allen | |
| 6,327,593 B1 | 12/2001 | Goiffon | |
| 6,363,477 B1 * | 3/2002 | Fletcher et al. | 709/224 |
| 6,460,043 B1 | 10/2002 | Tabbara et al. | |
| 6,553,368 B2 | 4/2003 | Martin et al. | |
| 6,601,065 B1 | 7/2003 | Nelson et al. | |
| 6,725,227 B1 | 4/2004 | Li | |
| 6,803,927 B1 | 10/2004 | Sahoo | |
| 6,820,076 B2 | 11/2004 | Bailey et al. | |
| 6,847,981 B2 * | 1/2005 | Song et al. | 707/104.1 |
| 6,928,431 B2 * | 8/2005 | Dettinger et al. | 1/1 |
| 6,954,748 B2 | 10/2005 | Dettinger et al. | |
| 6,996,558 B2 | 2/2006 | Dettinger et al. | |
| 7,024,425 B2 | 4/2006 | Krishnaprasad et al. | |
| 7,031,962 B2 * | 4/2006 | Moses | 707/783 |
| 7,096,229 B2 | 8/2006 | Dettinger et al. | |
| 7,171,399 B2 * | 1/2007 | Kapoor et al. | 1/1 |
| 2004/0254916 A1 * | 12/2004 | Dettinger et al. | 707/3 |
| 2005/0097099 A1 * | 5/2005 | Kapoor et al. | 707/3 |

OTHER PUBLICATIONS

Dettinger et al., IBM U.S. Appl. No. 10/083,075, filed Feb. 26, 2002, "Improved Application Portability and Extensibility Through Database Schema and Query Abstraction".
Llama, "Search Your Database", Jan. 18, 2002, Codewalkers, pp. 1-4.
Meng, Wiyi, et al, "A Theory of Translation from Relational Queries to Hierarchical Queries", Apr. 1995, IEEE, pp. 228-245.
Office Action History for U.S. Appl. No. 10/083,075 from Nov. 26, 2004 to Sep. 1, 2005.
Office Action History for U.S. Appl. No. 11/226,181 from Mar. 23, 2009 to Feb. 11, 2011.
Office Action History for U.S. Appl. No. 10/460,589 from Feb. 3, 2006 to Dec. 29, 2010.

* cited by examiner

*Primary Examiner* — Marc R Filipczyk
(74) *Attorney, Agent, or Firm* — Patterson & Sheridan, LLP

(57) ABSTRACT

The present invention generally is directed to methods, articles of manufacture and systems for presenting, to a user, a limited subset of fields of an underlying base data model. The limited subset of fields may be generated by applying one or more filters to select, exclude and/or modify the fields of the base data model. The base data model may contain abstract representations of fields in a data repository and may, therefore, serve as a data definition framework allowing data from the fields to be accessed independent of the particular manner (e.g., SQL, XML, etc.) in which the data is physically represented in the data repository.

21 Claims, 9 Drawing Sheets

| DATA REPOSITORY ABSTRACTION | 148 |
|---|---|

Field
  Name = "First Name" — $210_1$
  Access Method = "Simple" — $212_1$
    Table = "contact"
    Column = "f_name"
    Queryable = "Yes" — $215_1$    $208_1$

Field
  Name = "Last Name" — $210_2$
  Access Method = "Simple" — $212_2$
    Table = "contact"
    Column = "l_name"
    Queryable = "Yes" — $215_2$    $208_2$

Field
  Name = "City" — $210_3$
  Access Method = "Filtered" — $212_3$
    Table = "contact"
    Column = "city"
    Queryable = "Yes" — $215_3$    $208_3$

Field
  Name = "Street" — $210_4$
  Access Method = "Simple" — $212_4$
    Table = "contact"
    Column = "street"
    Queryable = "No" — $215_4$    $208_4$

Field
  Name = "Birthdate" — $210_5$
  Access Method = "Simple" — $212_5$
    Table = "contact"
    Column = "dob"
    Queryable = "Yes" — $215_5$    $208_5$

Field
  Name = "Age In Years" — $210_6$
  Access Method = "Composed" — $212_6$
    Expression = Years(Birthdate)
    Queryable = "Yes" — $215_6$    $208_6$

Field
  Name = "Age In Decades" — $210_7$
  Access Method = "Composed" — $212_7$
    Expression = Years(Birthdate)/10
    Queryable = "Yes" — $215_7$    $208_7$

| FILTER NAME = CONTACT INFO | 158 |
|---|---|

Include:
  Field Name = First Name
  Field Name = Last Name
  Field Name = City
  Field = Street
    Queryable = "Yes"

| FILTERED DATA REPOSITORY ABSTRACTION | 149 |
|---|---|

Field
  Name = "First Name" — $210_1$
  Access Method = "Simple" — $212_1$
    Table = "contact"
    Column = "f_name"
    Queryable = "Yes" — $215_1$    $208_1$

Field
  Name = "Last Name" — $210_2$
  Access Method = "Simple" — $212_2$
    Table = "contact"
    Column = "l_name"
    Queryable = "Yes" — $215_2$    $208_2$

Field
  Name = "City" — $210_3$
  Access Method = "Filtered" — $212_3$
    Table = "contact"
    Column = "city"
    Queryable = "Yes" — $215_3$    $208_3$

Field
  Name = "Street" — $210_4$
  Access Method = "Simple" — $212_4$
    Table = "contact"
    Column = "street"
    Queryable = "Yes" — $215_4$    $208_4$

*FIG. 2D*

ABSTRACT DATA MODEL FILTERS

CROSS RELATED APPLICATIONS

The present invention is related to the commonly owned, co-pending application Ser. No. 10/083,075, entitled "Improved Application Portability And Extensibility Through Database Schema And Query Abstraction," filed Feb. 26, 2002.

BACKGROUND OF THE INVENTION

1. Field of the Invention

The present invention generally relates to data processing and more particularly to applying filters to limit the number of data model fields presented to a user during a query building process.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In accordance with the EJB specification, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application built and deployment cycle to react to reorganization of the underlying physical data model or to support alternative data representations. EJB programming also requires specialized skills, since more advanced Java programming techniques are involved. Accordingly, the EJB approach and other similar approaches are rather inflexible and costly to maintain for general-purpose query applications accessing an evolving physical data model.

Another shortcoming of the prior art, is the manner in which information can be presented to the user. A number of software solutions support the use of user-defined queries, in which the user is provided with a "query-building" tool to construct a query that meets the user's specific data selection requirements. In an SQL-based system, the user is given a list of underlying database tables and columns to choose from when building the query. The user must decide which tables and columns to access based on the naming convention used by the database administrator, which may be cryptic, at best.

Further, while the number of tables and columns presented to the user may be vast, only a limited subset may actually be of interest. Therefore, nonessential content is revealed to the end user, which may make it difficult to build a desired query, as the nonessential content must be filtered out by the user. In other words, in a conventional data model, a single database schema encompasses all the data for an entity, although individual groups within the entity (teams, workgroups, departments, etc.) are typically only interested in a limited portion of the data. For example, in a medical research facility, a hemotology research group may only be interested in a limited number (e.g., 20-40) of medical tests, while an entity-wide data model may encompass thousands of tests. Accordingly, when building a query, members of the hemotology research group may spend a lot of effort just to filter through the large number of tests for which they have no interest.

Therefore, there is a need for an improved and more flexible method for presenting, to a user, a limited subset of all possible fields to choose from when building a query. Preferably, the limited subset of fields will only include fields of interest to the user.

SUMMARY OF THE INVENTION

The present invention generally provides methods, articles of manufacture and systems for presenting, to a user, a limited subset of all possible fields of a data model, for use when building a query.

For some embodiments, a computer implemented method for generating a filtered data repository abstraction component describing, and used to access, data in a data repository generally includes providing a base data abstraction component containing logical fields mapped to corresponding physical fields of the data repository, applying one or more filters to select a limited subset of the logical fields contained in the base data abstraction component, and generating a first filtered data abstraction component containing the limited subset of the logical fields.

For some embodiments, the article of manufacture generally includes a computer-readable medium containing a program which, when executed by a processor, performs operations for generating a filtered data repository abstraction component describing, and used to access, data in a data repository. The operations generally include providing a base data abstraction component containing logical fields mapped to corresponding physical fields of the data repository, applying one or more filters to select a limited subset of the logical fields contained in the base data abstraction component, and generating a first filtered data abstraction component containing the limited subset of the logical fields.

For some embodiments, the system generally includes a data repository, a base data abstraction component comprising logical fields mapped to corresponding physical fields of the data repository, one or more data model filters, and an executable component. The executable component is generally configured to apply at least one of the data model filters to the base data repository to generate a first filtered data abstraction component comprising a limited subset of the logical fields specified by the data model filter.

For some embodiments, a computer implemented method for limiting access to data generally includes receiving one or more user credentials, receiving a query from a requesting entity, selecting one or more filters based on the user credentials, and applying the one or more filters to the query to remove one or more fields from a results portion of the query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2B, 2C, and 2D illustrate an exemplary base data repository abstraction component, an exemplary data model filter, and an exemplary filtered data repository abstraction component, respectively, according to one embodiment of the present invention.

DETAILED DESCRIPTION OF THE PREFERRED EMBODIMENTS

The present invention generally is directed to methods, articles of manufacture and systems for presenting, to a user, a limited subset of fields of an underlying base data model. The limited subset of fields may be selected according to any appropriate technique and, for some embodiments, may be generated by applying one or more filters to select, exclude and/or modify the fields of the base data model. By filtering the fields of the base data model, a limited subset of fields that are of interest to the user may be automatically generated, in effect, providing the user with a custom data model tailored to the particular needs of the user. As used herein, the term filter generally refers to any data object that indicates the subset of fields (e.g., by explicit/implicit inclusion or exclusion) to be presented to the user.

In one embodiment of the present invention, the data model is implemented as a data repository abstraction (DRA) component containing a collection of abstract representations of physical fields of the database (hereinafter "logical fields"). Thus, this data abstraction model provides a logical view of the underlying database, allowing the user to generate "abstract" queries against the data warehouse without requiring direct knowledge of its underlying physical properties. A runtime component (e.g., a query execution component) performs translation of abstract queries (generated based on the data abstraction model) into a form that can be used against a particular physical data representation.

The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety. While the data abstraction model described herein provides one or more embodiments of the invention, persons skilled in the art will recognize that the concepts provided herein can be implemented without such a data abstraction model while still providing the same or similar results.

Exemplary Application Environment

Figure 1:
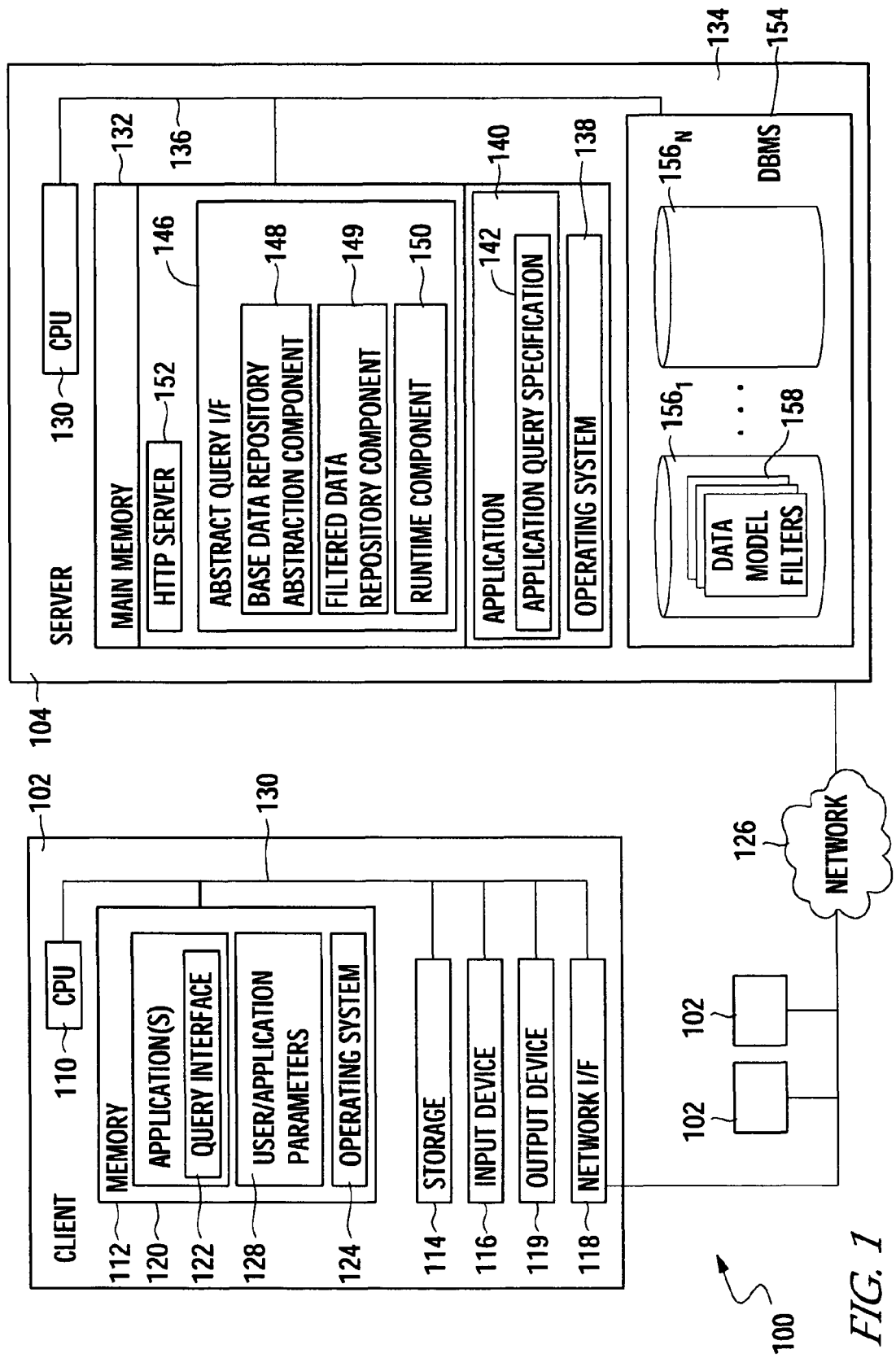
FIG. 1 is a computer system illustratively utilized in accordance with the present invention.

FIG. 1 shows an exemplary networked computer system 100, in which embodiments of the present invention may be utilized. For example, embodiments of the present invention may be implemented as a program product for use with the system 100, to generate a filtered data repository abstraction (DRA) component 149 by applying one or more data model filters 158 to a base DRA component 148 (used to represent fields in one or more databases $156_{1 \ldots N}$, organized as a database management system 154). The filtered DRA component 149 may present a user (e.g., a user of an application 120 running on a client computer 102) with a limited subset of fields from the base DRA component 148 in order to access data from the one or more databases $156_{1 \ldots N}$.

The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

As illustrated in FIG. 1, the system 100 generally includes client computers 102 and at least one server computer 104, connected via a network 126. In general, the network 126 may be a local area network (LAN) and/or a wide area network (WAN). In a particular embodiment, the network 126 is the Internet.

As illustrated, the client computers 102 generally include a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a client 102 may include a display screen with an integrated touch-screen or a display with an integrated keyboard.

The network interface device 118 may be any entry/exit device configured to allow network communications between the client 102 and the server 104 via the network 126. For example, the network interface device 118 may be a network adapter or other network interface card (NIC). If the client 102 is a handheld device, such as a personal digital assistant (PDA), the network interface device 118 may comprise any suitable wireless interface to provide a wireless connection to the network 126.

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing a query building interface 122, such as a browser program, that, when executed on CPU 110, provides support for building queries based on the data repository abstraction component 148. In one embodiment, the query interface 122 includes a web-based Graphical User Interface (GUI), which allows the user to display Hyper Text Markup Language (HTML) information. More generally, however, the query interface 122 may be any program (preferably GUI-based) capable of exposing a portion of the DRA component 148 on the client 102 for use in building queries. As will be described in greater detail below, queries built using the query interface 122 may be sent to the server 104 via the network 126 to be issued against one or more databases 156.

The server 104 may be physically arranged in a manner similar to the client computer 102. Accordingly, the server 104 is shown generally comprising a CPU 130, a memory 132, and a storage device 134, coupled to one another by a bus 136. Memory 132 may be a random access memory sufficiently large to hold the necessary programming and data structures that are located on the server 104.

The server 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used. As illustrated, the server 104 may be configured with an abstract query interface 146 for issuing abstract queries (e.g., received from the client application 120) against one or more of the databases 156.

In one embodiment, elements of a query are specified by a user through the query building interface 122 which may be implemented as a browser program presenting a set of GUI screens for building queries. The content of the GUI screens may be generated by application(s) 140. In a particular embodiment, the GUI content is hypertext markup language (HTML) content which may be rendered on the client computer systems 102 with the query building interface 122. Accordingly, the memory 132 may include a Hypertext Transfer Protocol (http) server process 138 (e.g., a web server) adapted to service requests from the client computer 102. For example, the server process 152 may respond to requests to access the database(s) 156, which illustratively resides on the server 104. Incoming client requests for data from a database 156 invoke an application 140 which, when executed by the processor 130, perform operations necessary to access the database(s) 156. In one embodiment, the application 140 comprises a plurality of servlets configured to build GUI elements, which are then rendered by the query interlace 122.

Referring back to the client 102, the memory 112 may also contain one or more parameters 128 that may be used to identify the application 120 and/or a user of the application 120. The parameters 128 may therefore be accessed to determine which of the data model filters 158 to apply to the base DRA component 148 in order to create a filtered DRA component 149 containing subset of logical fields tailored to the particular needs of an application 120 or a user thereof. For example, as previously described, the applications 120 may be used by different groups (departments, workgroups, etc.) within the same entity to query the databases 156 represented by the base DRA component 148, although each group may only be interested in a limited portion of data stored therein. Accordingly, in an effort to limit the number of logical fields presented to users of each group, select filters 158, chosen according to a particular application 120, may be applied to the base DRA component 148 to generate a filtered DRA component 149 containing a limited subset of logical fields specific to the particular application 120.

An Exemplary Runtime Environment

Figure 2A:
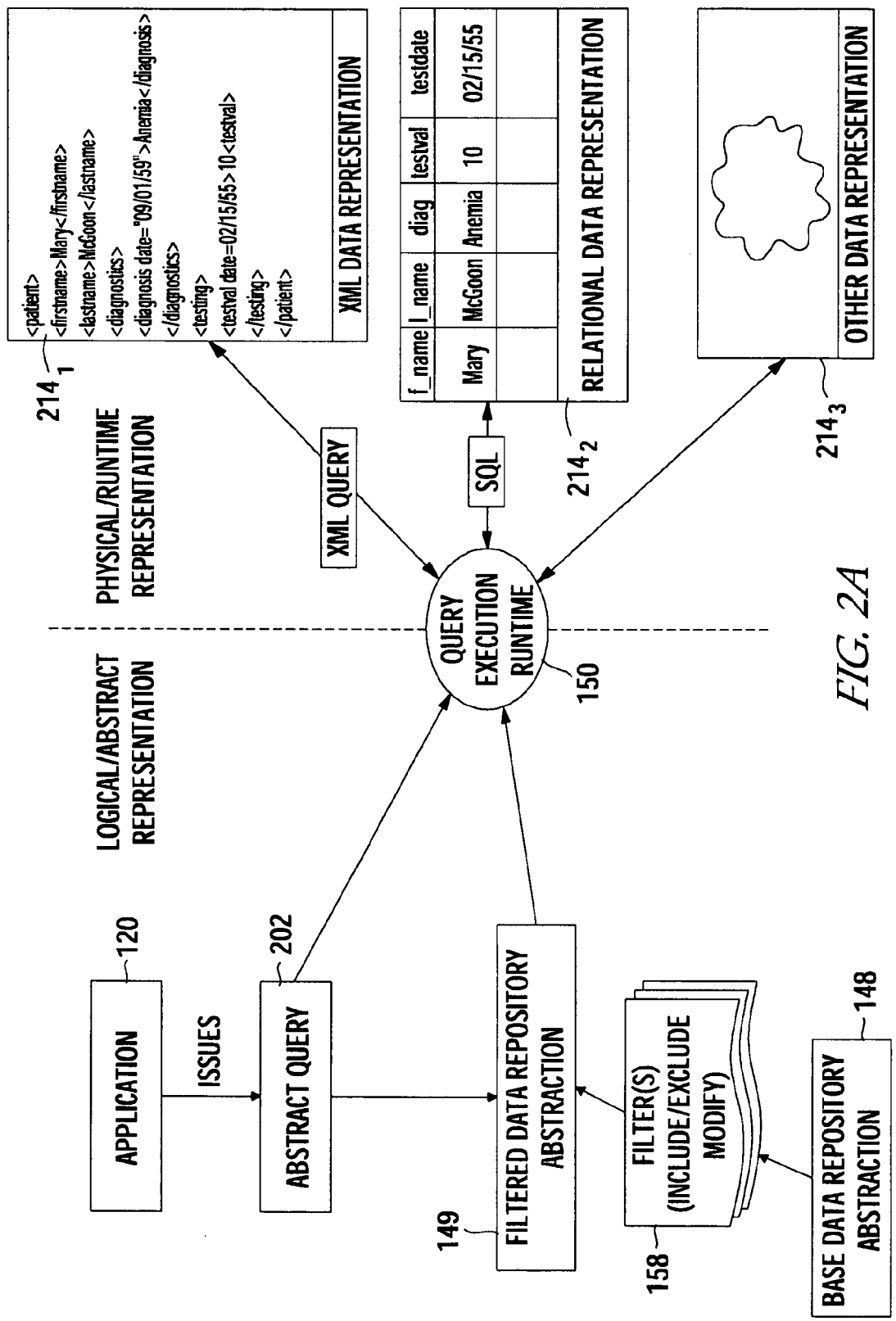
FIG. 2A is a relational view of software components, including a filtered data repository abstraction component, of one embodiment of the present invention.

Before describing generation of the filtered DRA component 149 in detail, however, operation of the abstract query interface 146 will be described with reference to FIGS. 2A and 2B. FIG. 2A illustrates a relational view of a client application 120, DRA component 148, filtered DRA component 149, and query execution component 150, according to one embodiment of the invention. As shown, the application 120 may issue an abstract query 202, which may be executed by the query execution component 150. The abstract query 202 may be generated by specifying query conditions (criteria) and results involving logical fields contained in the filtered DRA component 149.

An illustrative abstract query corresponding to the abstract query 202 is shown in Table I below. By way of illustration, the abstract query 202 is defined using XML. However, any other language may be used to advantage.

TABLE I

QUERY EXAMPLE

```
001    <?xml version="1.0"?>
002    <!--Query string representation: (FirstName = "Mary" AND LastName =
003    "McGoon") OR State = "NC"-->
004    <QueryAbstraction>
005      <Selection>
006        <Condition internalID="4">
007          <Condition field="FirstName" operator="EQ" value="Mary"
008    internalID="1"/>
009          <Condition field="LastName" operator="EQ" value="McGoon"
010    internalID="3" relOperator="AND"></Condition>
011        </Condition>
012        <Condition field="City" operator="EQ" value="NC" internalID="2"
013    relOperator="OR"></Condition>
014      </Selection>
015      <Results>
016        <Field name="FirstName"/>
017        <Field name="LastName"/>
018        <Field name="City"/>
019      </Results>
020    </QueryAbstraction>
```

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

The logical fields used to compose the abstract query 202 are defined by the filtered DRA component 149, which may be generated by applying one or more filters 158 to include, exclude and/or modify logical fields contained in the base DRA component 148. As previously described, the logical fields are defined independently of the underlying data representation being used in the DBMS 154, thereby allowing queries to be formed that are loosely coupled to the underlying data representation. For example, as illustrated in FIG. 2B, the DRA component 148 includes a set of logical field specifications 208 that provide abstract representations of corresponding fields in a physical data representation 214 of data in the one or more databases 156 shown in FIG. 1.

Each logical field specification 208 may include various information used to map the specified logical field to the corresponding physical field, such as field names 210, table names, and access methods 212 describing how to access and/or manipulate data from the corresponding physical field in the physical data representation 214. The physical data representation may be an XML data representation $214_1$, a relational data representation $214_2$, or any other data representation, as illustrated by $214_N$. Therefore, regardless of the actual physical data representation, a user may generate, via the query building interface 122 (shown in FIG. 1) of the client application 120, an abstract query 202 including query conditions based on the logical fields defined by the logical field specifications 208, in order to access data stored therein.

Referring back to FIG. 2A, the query execution component 150 is generally configured to execute the abstract query 202 by transforming the abstract query 202 into a concrete query compatible with the physical data representation (e.g., an XML query, SQL query, etc). The query execution component 150 may transform the abstract query 202 into the concrete query by mapping the logical fields of the abstract query 202 to the corresponding physical fields of the physical data representation 214, based on mapping information in the filtered DRA component 149. The mapping of abstract queries to concrete queries, by the query execution component 150, is described in detail in the previously referenced co-pending application Ser. No. 10/083,075.

The filtered DRA component 149 may be generated by applying one or more filters 158 to the base DRA component 148. As an illustration, the filter 158 illustrated in FIG. 2C may be applied to the DRA component 148 of FIG. 2B, to select a limited subset of the logical field specifications 208 contained therein, in order to generate the filtered DRA component 149 illustrated in FIG. 2D. An illustrative representation corresponding to the filter 158 of FIG. 2C is shown in Table II below. By way of illustration, the representation shown below is defined using XML. However, any other language may be used to advantage.

TABLE II

DATA MODEL FILTER EXAMPLE

| | |
|---|---|
| 001 | <?xml version="1.0"?> |
| 002 | <Include> |
| 003 |   <Category name="Demographic"> |
| 004 |     <Include> |
| 005 |       <Field name="First Name"></Field> | categories and fields within the category) or may be only partially included in the filtered DRA component 149. In either case, a filter 158 may either explicitly include fields (categories, or subcategories), as shown in the example listing of TABLE II, or explicitly exclude fields (categories, or subcategories) in the filtered DRA component 149. The exact implementation may vary with different embodiments, and may depend, for example, on the number of logical fields in the DRA component 148 relative to the number of logical fields to include in the filtered DRA component 149. In other words, if the filtered DRA component 149 will contain a relatively small number of logical fields when compared to the total number of fields in the base DRA component 148, explicitly listing logical fields to include may be more practical than explicitly listing logical fields to exclude.

An illustrative representation corresponding to the filtered DRA component 149 shown in FIG. 2D is shown in Table III below. By way of illustration, the representations are shown below are defined using XML. However, any other language may be used to advantage.

TABLE III

DATA REPOSITORY ABSTRACTION EXAMPLE

| | |
|---|---|
| 001 | <?xml version="1.0"?> |
| 002 | <DataRepository> |
| 003 |   <Category name="Demographic"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |       <Type baseType="char"></Type> |
| 009 |     </Field> |
| 010 |     <Field queryable="Yes" name="LastName" displayable="Yes"> |
| 011 |       <AccessMethod> |
| 012 |         <Simple columnName="l_name" tableName="contact"></Simple> |
| 013 |       </AccessMethod> |
| 014 |       <Type baseType="char"></Type> |
| 015 |     </Field> |
| 016 |     <Field queryable="Yes" name="City" displayable="Yes"> |
| 017 |       <AccessMethod> |
| 018 |         <Simple columnName="city" tableName="contact"></Simple> |
| 019 |       </AccessMethod> |
| 020 |       <Type baseType="char"></Type> |
| 021 |     </Field> |
| 016 |     <Field queryable="Yes" name="Street" displayable="Yes"> |
| 017 |       <AccessMethod> |
| 018 |         <Simple columnName="street" tableName="contact"></Simple> |
| 019 |       </AccessMethod> |
| 020 |       <Type baseType="char"></Type> |
| 021 |     </Field> |
| 022 |   </Category> |
| 023 | </DataRepository> |

TABLE II-continued

DATA MODEL FILTER EXAMPLE

| | |
|---|---|
| 006 |       <Field name="Last Name"></Field> |
| 007 |       <Field name="City"></Field> |
| 008 |       <Field name="Street" queryable="Yes"> |
| 009 |     </Include> |
| 010 |   </Category> |
| 011 | </Include> |

As illustrated, the filter 158 shown in TABLE II selects logical fields $208_1$-$208_4$ from the DRA component 148 for inclusion in the filtered DRA component 149. As illustrated, logical fields 208 may be organized in individual categories, which may be included in their entirety (including all sub- In addition to including and/or excluding logical fields of the base DRA component 148 for use in generating the filtered DRA component 149, the filter 158 may also modify logical fields of the base DRA component 148. For example, as shown, the logical field specifications 208 may include one or more attributes 215 that indicate whether the corresponding logical field may be queried (e.g. searched). Various other type attributes may also be defined for a logical field including, but not limited to attributes that indicate whether the field is displayable and or whether the logical field is read-only. Regardless, for any field included in the filtered DRA component 149, the filter 158 may also modify one or more of the attributes. As shown in FIGS. 2B-2D, the logical field Street, while not queryable in the base DRA component 148 may be queryable in the filtered DRA component 149. Such modification of attributes may allow different applications to access data in different ways, without requiring changes to the underlying base DRA component 148, thus simplifying maintenance.

Applications of Abstract Data Model Filters

Figure 3:
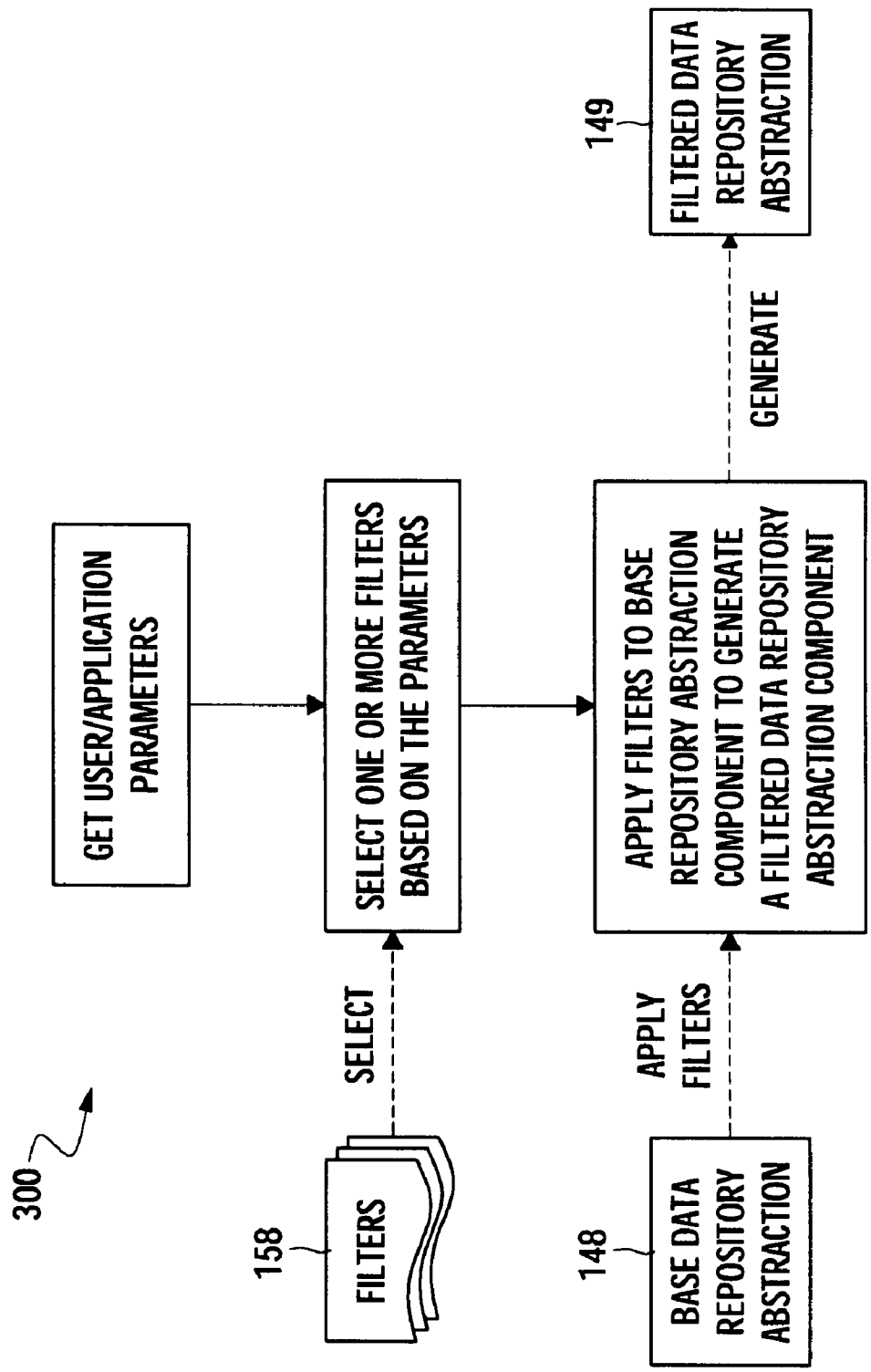
FIG. 3 is a flow chart illustrating exemplary operations for generating a filtered data repository abstraction component according to aspects of the present invention.

FIG. 3 illustrates exemplary operations 300 for generating the filtered DRA component 149 from the base DRA component 148. For various embodiments, the operations 300 may be performed by different software components, such as the query execution component 150, a subcomponent thereof, one or more other components of the abstract query interface 146, and/or one or more components of the client application 120. The operations 300 may be performed, for example, as part of an initialization routine the first time the application 120 is invoked and/or the first time a new user uses the application 120.

The operations begin at step 302 by obtaining user or application parameters. At step 304, one or more filters are selected based on the parameters, for example, one or more filters specific to a user or application indicated by the parameters. At step 306, the one or more filters are applied to the base DRA component 148 to generate the filtered DRA component 149.

Figure 4A:
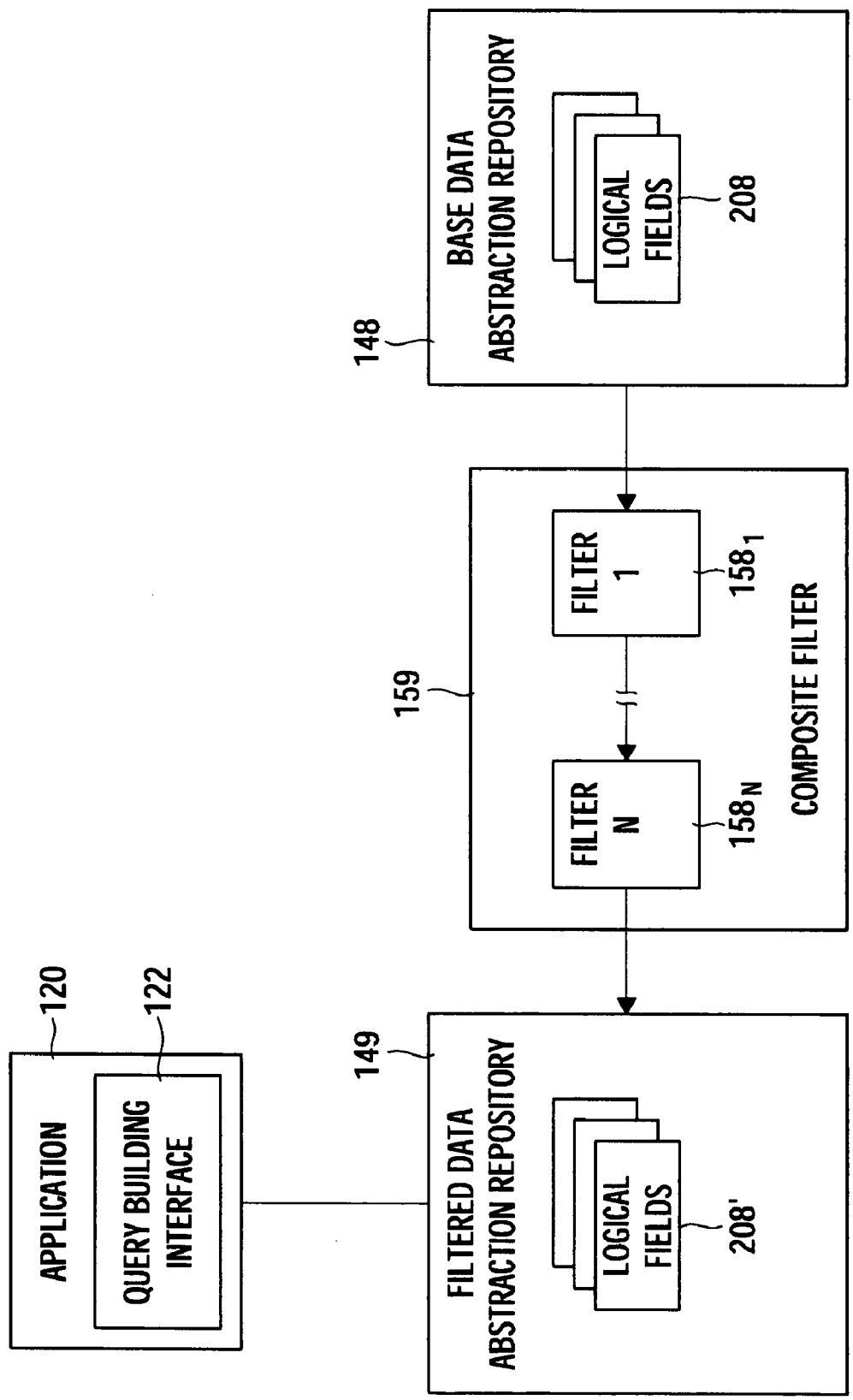
FIGS. 4A-4C illustrate the generation and use of filtered data repository abstraction components, according to various embodiments of the present invention.
Figure 4B:
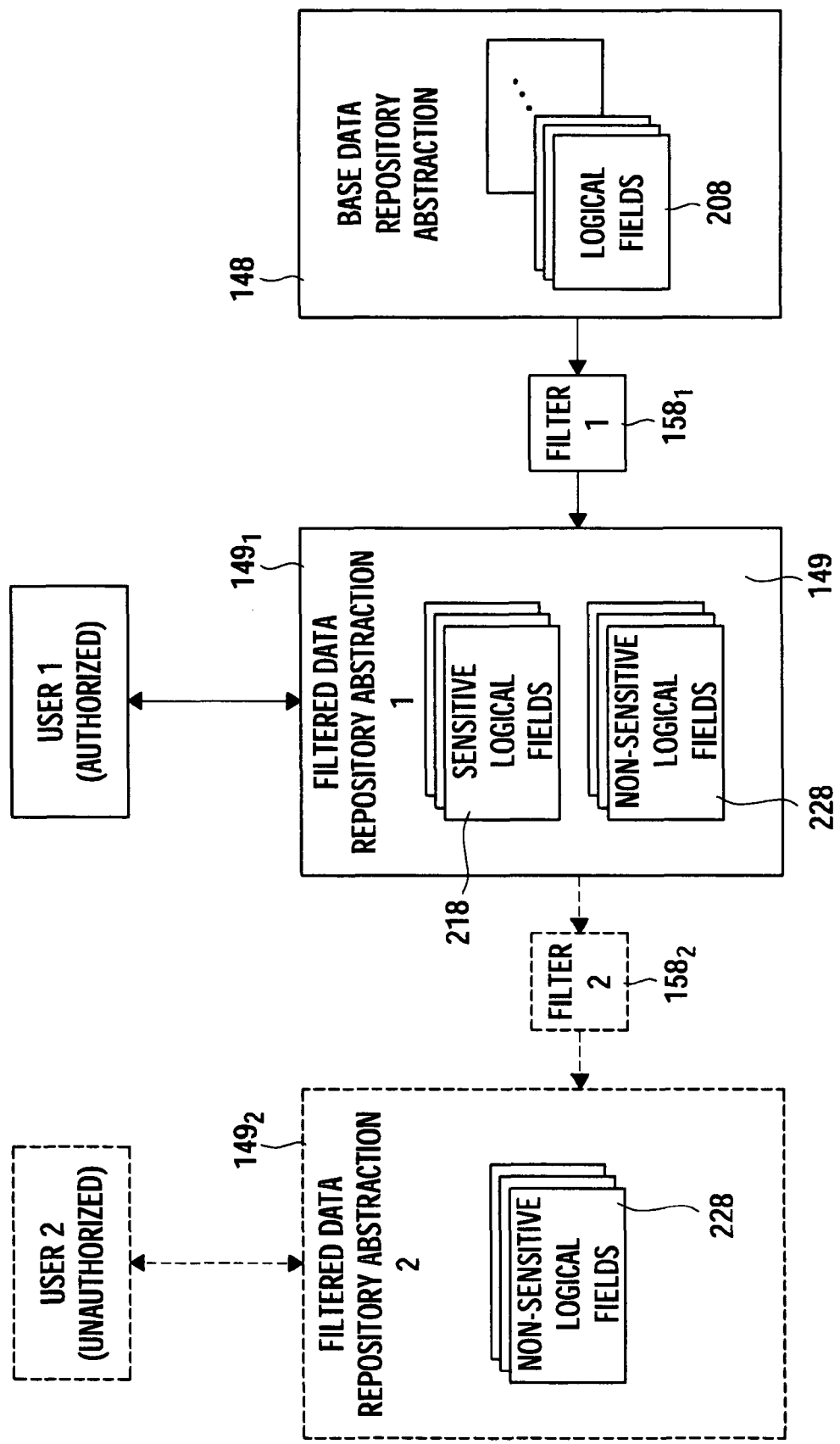
Figure 4C:
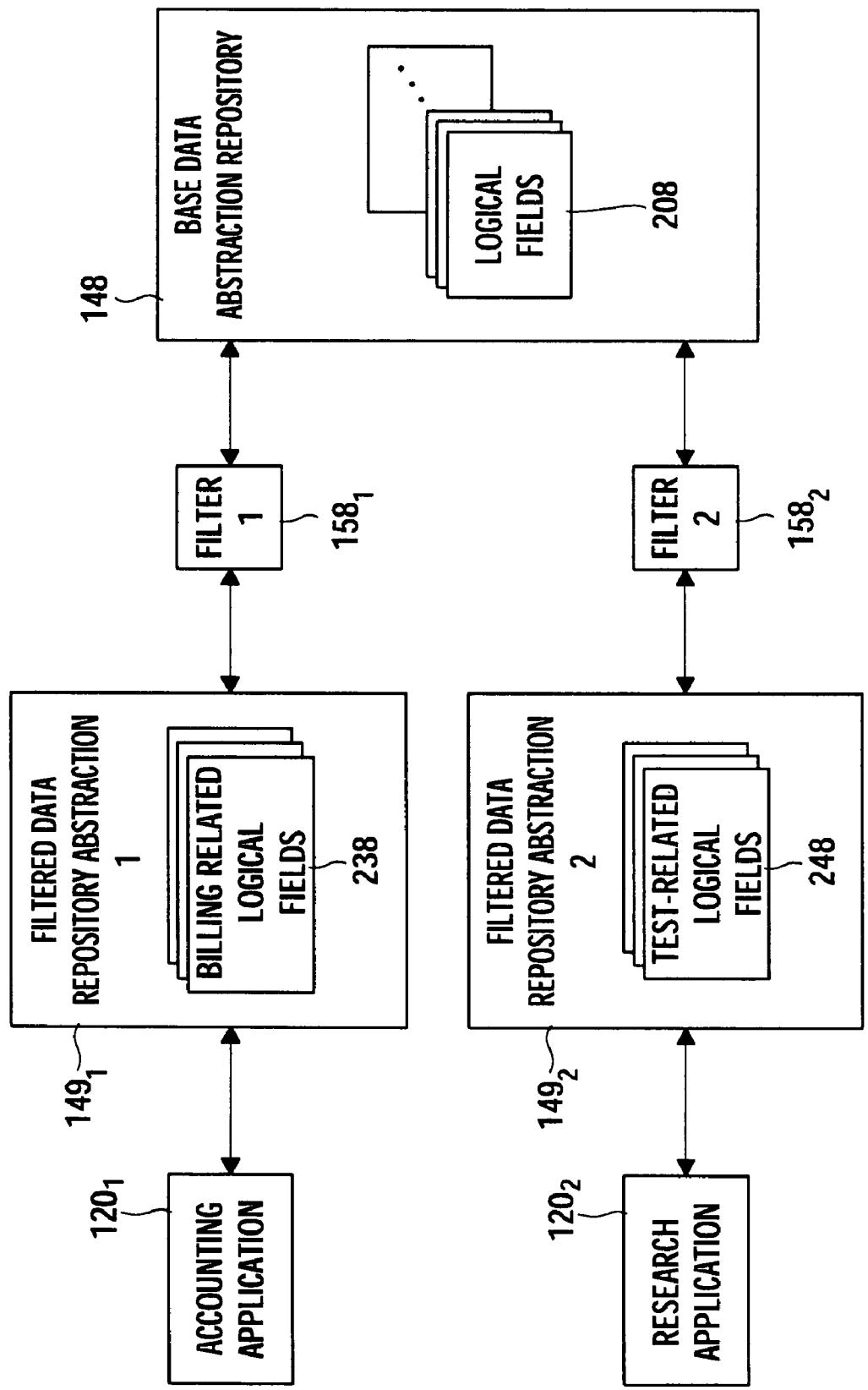

As illustrated in FIGS. 4A-4C, filters 158 may be applied in various manners to generate one or more filtered DRA components 149. For example, as illustrated in FIG. 4A, a series of filters $158_1$-$158_N$ may be applied to the base DRA component 148 to generate a filtered DRA component 149 containing a limited subset of logical fields 208' that represents an intersection of logical fields exposed by each of the filters 158 in the series. In other words, the series of filters may be regarded as a composite filter 159, where each filter (e.g., $158_i$) may further limit the subset of logical fields exposed by the previous filter (e.g., $158_{i-1}$). In a similar manner, multiple filters $158_1$-$158_N$ may be applied in parallel to generate a subset of logical fields 208' that represents a union of logical fields exposed by each of the filters 158. In either case, an advantage to this composite filter approach is that a set of modular filters 158 may be defined that each specifies a set of fields to include/exclude from the base DRA component 148. These modular filters 158 may then be combined, as desired, to create the desired subset 208' of logical fields in the filtered DRA component 149.

In some cases, as illustrated in FIG. 4B, for various reasons, a first filtered DRA component $149_1$ may be further filtered to generate a second filtered DRA component $149_2$. For example, the first filtered DRA component $149_1$ may be generated by applying a first filter $158_1$ to the base DRA component 148 to select one or more sensitive logical fields 218 and one or more non-sensitive logical fields 228 from the logical fields 208 of the base DRA component 148. The sensitive logical fields 218 may contain sensitive data and may, therefore, only be viewed by authorized users (e.g., users having a predetermined security level). A second filter $158_2$ may be applied to the first filtered DRA component $149_1$ to select only the non-sensitive fields 228 for inclusion in the second filtered DRA component $149_2$.

Accordingly, as shown, the first filtered DRA component $149_1$ may be accessed by a first user authorized to access the sensitive logical fields 218 contained therein, while the second DRA component $149_2$ may be accessed by a second user only authorized to access the non-sensitive logical fields 228. As another example, a company (such as a legal research provider) may provide subscription based searches of a proprietary database. The first filtered DRA component $149_1$ may allow the first user (having a first type of subscription) to access a broader collection of data, while the second DRA component $149_2$ may allow the second user (having a second type of subscription) to access a more limited collection of data.

As shown in FIG. 4C, multiple filtered DRA components may also be generated by applying different filters to the same base DRA component 148 to select different subsets of logical fields 208 for specific applications. For example, a first filter $158_1$ may be applied to the DRA component 148 to generate a first filtered DRA component $149_1$ containing a first subset of fields 238 related to billing matters (e.g., patient names, addresses, account information, etc.). In a similar manner, a second filter $158_2$ may be applied to the DRA component 148 to generate a second filtered DRA component $149_1$ containing a second subset of fields 248 related to related to medical tests (e.g., types of tests, test results, test dates, etc.). As illustrated, the first filtered DRA component $149_1$ may be accessed by an accounting application $120_1$, while the second filtered DRA component $149_2$ may be accessed by a research application $120_2$. Thus, the filtered DRA components 149 may expose only fields of interest to the corresponding applications 120, which may greatly simplify the query building process by eliminating the need to manually filter through unrelated fields.

Figure 5:
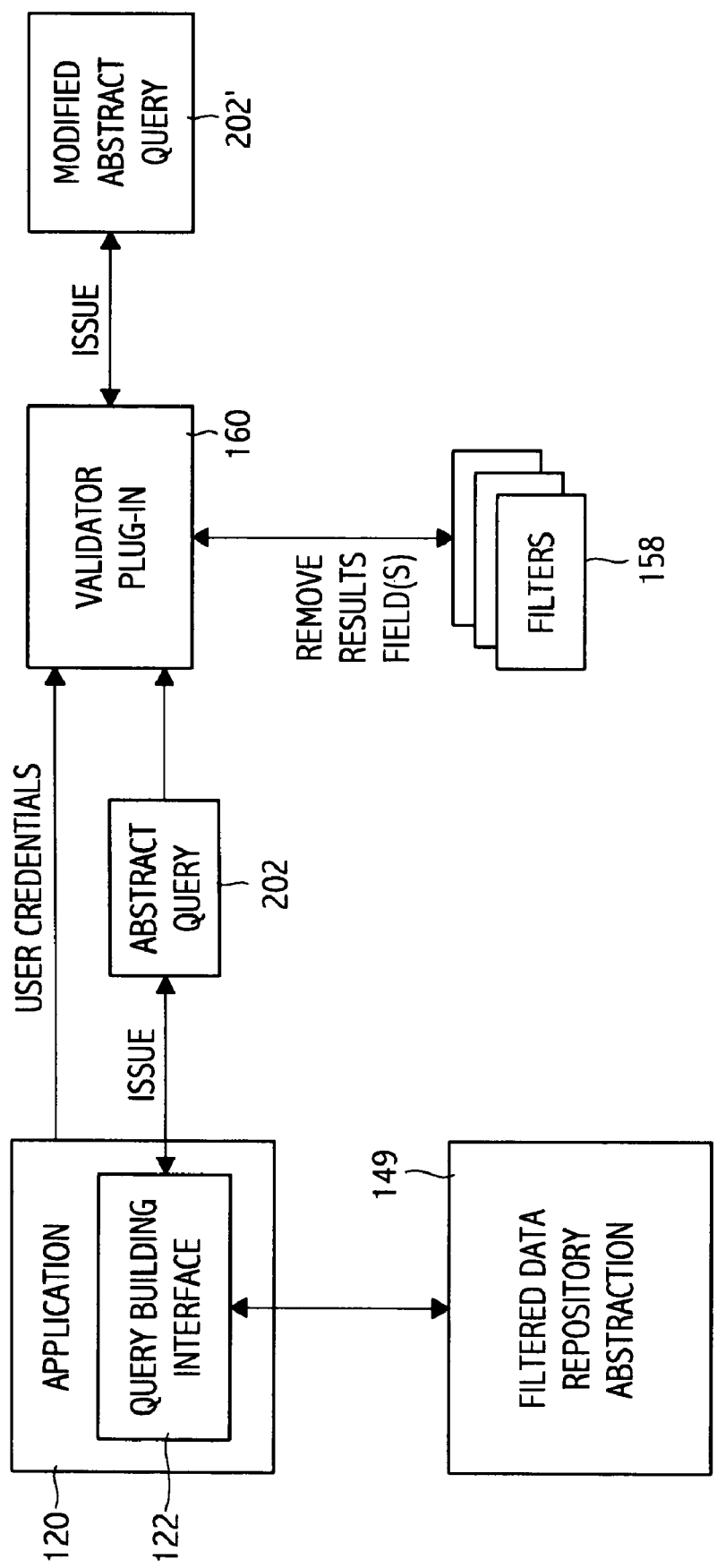
FIG. 5 illustrates an alternative application for abstract data model filters according to one embodiment of the present invention.
Figure 6:
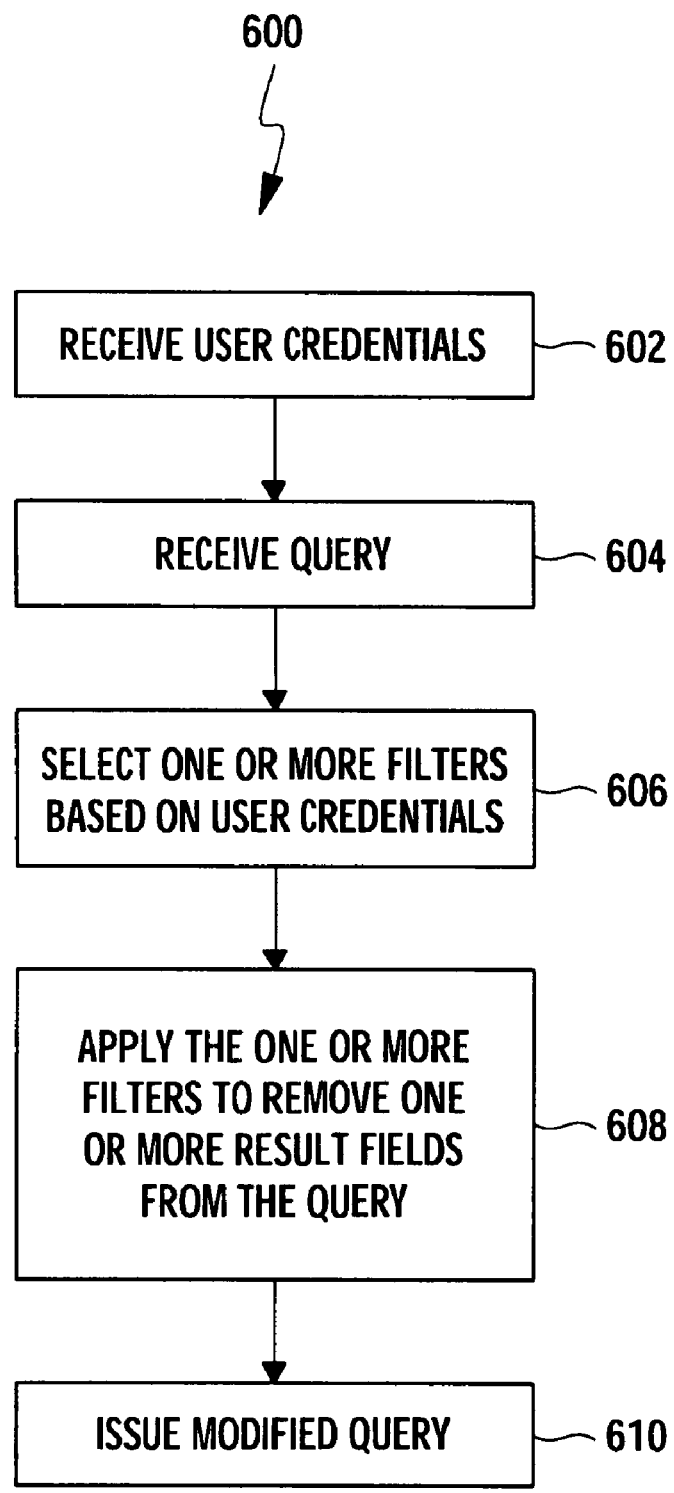
FIG. 6 is a flow chart illustrating exemplary operations for applying abstract data model filters in accordance with the embodiment illustrated in FIG. 5.

For some embodiments, abstract data model filters may be used for purposes other than to generate filtered DRA components 149. For example, as illustrated in FIG. 5, a validation component 160 may apply one or more abstract data model filters 158 to remove one or more sensitive fields from a results portion (e.g., a portion of the query that specifies fields to include as query results) of an abstract query 202. Of course, as previously described, the filters 158 may explicitly list fields to include or exclude. In other words, the filters may define fields that are to be removed from the list of result fields or may define fields that are allowed to appear in the list of result fields for a query. Regardless, the validation component 160 may validate a user's credentials (e.g., supplied by the application 120) prior to returning certain (e.g., sensitive) data as query results. The validation component 160, for example, may be implemented as a plug-in component to the query execution component 150 shown in FIG. 2A. For one embodiment, the validation component 160 may be generally configured to perform exemplary operations 600 illustrated in FIG. 6.

At step 602, the validation component 160 receives user credentials, for example, indicative of a security level (user group, etc.) of a user of the application 120. At step 604, the validation component 160 receives an abstract query 202 issued by the application 120. The abstract query 202 may be generated, for example, via the query building interface 122, based on logical fields contained in the filtered DRA component 149. At step 606, the validation component 160 selects one or more filters based on user credentials. At step 608, the validation component 160 modifies the abstract query 202 by applying the one or more filters 158 to remove one or more fields from the query. For example, if the user's credentials show the user is not authorized to view one or more fields, the validation component may select a filter 158 to exclude those fields from the query results (e.g., by removing one or more results fields such as those listed in lines 16-18 of TABLE I). At step 610, the modified query (i.e., with one or more fields removed from the query results) is issued.

It should be noted that the same filter (as applied in step 608) could have been applied when generating the filtered DRA component 149, to exclude the sensitive field(s) therefrom. However, providing validation after a query is built may provide a greater degree of flexibility, allowing the filtered DRA component 149 to support a larger number of applications and/or users, while still providing secure access to data by excluding unauthorized users from viewing sensitive fields. In other words, unauthorized viewers may be aware of the sensitive fields, but they are still prohibited from viewing data stored therein. It should be further noted, that the concept of validation and modifying a query to remove results fields is not limited to abstract queries, and may be applied to "concrete" queries involving physical fields.

CONCLUSION

A base data repository abstraction (DRA) component may include logical field specifications that map abstract logical fields to corresponding fields of data having a particular physical representation. A filtered DRA component, specific to a particular application or group of users, may be generated by applying one or more filters to the base DRA component to select a limited subset of the logical fields contained therein. The filtered DRA component may greatly simplify the query building process by limiting the number of fields presented to a user to those of interest.

While the foregoing is directed to embodiments of the present invention, other and further embodiments of the invention may be devised without departing from the basic scope thereof, and the scope thereof is determined by the claims that follow.

What is claimed is:

1. A computer implemented method for generating a filtered data repository abstraction component describing, and used to access, data in a data repository, comprising:
   providing a base data repository abstraction component containing logical fields, wherein each logical field references an access method specifying a method for accessing a set of data maintained in the data repository;
   selecting one or more of the logical fields contained in the base data repository abstraction component; and
   generating a first filtered data repository abstraction component containing the selected one or more of the logical fields, wherein the one or more logical fields are available for use in building an abstract query processed by a runtime component.

2. The method of claim 1, further comprising generating a second filtered data repository abstraction component by selecting different one or more of the logical fields contained in the base data repository abstraction component.

3. The method of claim 1, further comprising generating a second filtered data repository abstraction component by selecting one or more of the logical fields contained in the first filtered data repository abstraction component.

4. The method of claim 3, wherein the first filtered data repository abstraction component, but not the second filtered data repository abstraction component, comprises one or more logical fields that map to data in the data repository containing data viewable only by an authorized user.

5. The method of claim 1, wherein selecting the one or more of the logical fields comprises applying one or more filters to base data repository abstraction component.

6. The method of claim 5, wherein applying the one or more filters to select the one or more of the logical fields contained in the base data repository abstraction component comprises modifying an attribute of at least one of the one or more of the logical fields.

7. The method of claim 6, wherein the modified attribute provides an indication of at least one of whether the associated logical field is queryable or viewable.

8. The method of claim 5, wherein at least one of the filters indicates one or more logical fields of the data abstraction component to exclude from the first filtered data repository abstraction component.

9. The method of claim 5, further comprising:
   obtaining one or more parameters; and
   selecting the one or more filters based on the one or more parameters.

10. The method of claim 9, wherein the one or more parameters provide an indication of at least one of a user security level or the identity of a particular application.

11. The method of claim 5, wherein the first filtered data repository abstraction component comprises an intersection of logical fields selected by each of the one or more filters.

12. A computer readable storage medium containing a program which, when executed, performs operations for generating a filtered data repository abstraction component describing, and used to access, data in a data repository, the operations comprising:
   providing a base data repository abstraction component containing logical fields, wherein each logical field references an access method that specifies a method for accessing a set of data maintained in the data repository;
   applying one or more filters to select one or more of the logical fields contained in the base data repository abstraction component; and
   generating a first filtered data repository abstraction component containing the selected one or more of the logical fields, wherein the one or more logical fields are available for use in building an abstract query processed by a runtime component.

13. The computer readable storage medium of claim 12, wherein the operations further comprise:
   obtaining one or more parameters; and
   selecting the one or more filters based on the one or more parameters.

14. The computer readable storage medium of claim 13, wherein at least one of the parameters is indicative of a user security level, indicated by user credentials, used to determine which logical fields of the base data repository abstraction component that an individual may include in an abstract query.

15. The computer readable storage medium of claim 12, wherein the operations further comprise generating a second filtered data repository abstraction component by applying a different one or more filters to the base data repository abstraction component.

16. The computer readable storage medium of claim 12, wherein the operations further comprise generating a second filtered data repository abstraction component by applying a different one or more filters to the first filtered data repository abstraction component.

17. A data processing system, comprising:
   at least one processor;
   a data repository;
   a base data repository abstraction component comprising logical fields, wherein each logical field references an access method that specifies a method for accessing an actual set of data maintained in the data repository;
   one or more filters, each specifying one or more of the logical fields; and an executable component, which when executed by the at least one processor, is configured to apply one or more of the filters to the base data repository to generate a first filtered data abstraction component comprising one or more of the logical fields, wherein the one or more logical fields are available for use in building an abstract query processed by a runtime component.

18. The data processing system of claim 17, wherein the executable component is further configured to generate a second filtered data repository abstraction component.

19. The data processing system of claim 18, further comprising:
- a first application configured to generate queries based on logical fields of the first filtered data repository abstraction component; and
- a second application configured to generate queries based on logical fields of the second filtered data repository abstraction component.

20. The data processing system of claim 18, wherein the executable component is configured to generate the second filtered data repository abstraction component by applying a one or more filters to the base data repository abstraction component, different from the one or more filters applied to generate the first filtered data repository abstraction component.

21. The data processing system of claim 18, wherein the executable component is configured to generate the second filtered data repository abstraction component by applying a one or more filters to the first filtered data repository abstraction component, different from the one or more filters applied to generate the first filtered data repository abstraction component.

* * * * *